(12) United States Patent
Zhao (10) Patent No.: US 8,902,396 B2
(45) Date of Patent: Dec. 2, 2014

(54) METHOD OF MANUFACTURING A LIQUID CRYSTAL DISPLAY PANEL

(71) Applicant: Beijing Boe Optoelectronics Technology Co., Ltd., Beijing (CN)

(72) Inventor: Haiyu Zhao, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 14/070,971

(22) Filed: Nov. 4, 2013

(65) Prior Publication Data

US 2014/0057520 A1   Feb. 27, 2014

Related U.S. Application Data

(62) Division of application No. 12/787,672, filed on May 26, 2010, now Pat. No. 8,605,245.

(30) Foreign Application Priority Data

Jun. 1, 2009   (CN) .......................... 2009 1 0085844

(51) Int. Cl.
*G02F 1/1339* (2006.01)
*G02F 1/1335* (2006.01)

(52) U.S. Cl.
CPC .. *G02F 1/13394* (2013.01); *G02F 2001/13396* (2013.01); *G02F 2001/13398* (2013.01); *G02F 1/133512* (2013.01)
USPC ....................................................... 349/155

(58) Field of Classification Search
USPC ....................................................... 349/155
See application file for complete search history.

(56) References Cited

U.S. PATENT DOCUMENTS

| 4,130,408 | A | 12/1978 | Crossland et al. |
| 5,717,287 | A | 2/1998 | Amrine et al. |
| 6,572,941 | B1 | 6/2003 | Murakami et al. |
| 7,724,342 | B2 * | 5/2010 | Jeon et al. ..................... 349/155 |
| 8,023,091 | B2 | 9/2011 | Kim |
| 2006/0285057 | A1 | 12/2006 | Kawamura et al. |

FOREIGN PATENT DOCUMENTS

| CN | 1916742 A | 2/2007 |
| CN | 101320174 A | 12/2008 |
| CN | 101334561 A | 12/2008 |
| KR | 1020060078524 A | 7/2006 |

OTHER PUBLICATIONS

USPTO RR dated Jun. 7, 2012 in connection with U.S. Appl. No. 12/787,672.

(Continued)

*Primary Examiner* — Eric Wong
(74) *Attorney, Agent, or Firm* — Ladas & Parry LLP (57) ABSTRACT

A method of manufacturing a liquid crystal display (LCD) panel is provided, and the LCD panel comprises: a first substrate and a second substrate, which are assembled together to form a cell, in which liquid crystal; and spacers formed between the first substrate and the second substrate. The spacers comprise, at least, first-type spacers and second-type spacers, which are formed of different kinds of materials, the material for the first-type spacers has a thermal expansion coefficient lower than that of liquid crystal, the material for the second-type spacers has a thermal expansion coefficient higher than that of liquid crystal, and the first-type spacers and the second-type spacers are disposed in alternation.

6 Claims, 4 Drawing Sheets

(56) References Cited

OTHER PUBLICATIONS

USPTO NFOA dated Aug. 6, 2012 in connection with U.S. Appl. No. 12/787,672.

USPTO FOA dated Jan. 17, 2013 in connection with U.S. Appl. No. 12/787,672.

USPTO NOA mailed Aug. 6, 2013 in connection with U.S. Appl. No. 12/787,672.

* cited by examiner

METHOD OF MANUFACTURING A LIQUID CRYSTAL DISPLAY PANEL

BACKGROUND

Embodiments of the present invention relate to a liquid crystal display (LCD) panel and a method of manufacturing the same.

A LCD panel comprises a first substrate and a second substrate, which are usually an array substrate and a color filter substrate respectively. The LCD panel is formed through injecting liquid crystal into the space between the two substrates. During manufacturing of a LCD panel, the thickness of the liquid crystal layer is an important parameter, controlled by the distance between the two substrates, i.e., the cell gap.

To maintain a consistent cell gap between the two substrates across the entire LCD panel, the first substrate and the second substrate, before assembled together, have spacers with a certain height disposed in between. Typical spacers have two major types, ball spacers (BSs) and post spacers (PSs). BSs are usually dispensed onto the first or the second substrate through sputtering; the positioning of BSs is, therefore, inaccurate, which may lead to light leakage. If employed, PSs are usually provided on the black matrix of the color filter substrate or in the light-shielding areas of the array substrate, such as the TFT (Thin Film Transistor) switches, the gate lines, or the data lines. In contrast with BSs, PSs can be positioned in the non-display area or the light-shielding area with high accuracy, which avoids light leakage.

Notwithstanding the above, a LCD panel employing PSs to maintain the cell gap has some shortcomings. For a LCD panel that is manufactured at room temperature, its liquid crystal's volume increases at high temperature due to thermal expansion; while a LCD panel is positioned vertical to the ground when in use, it, therefore, may have the defect of gravity mura. A LCD panel's volume decreases at low temperature due to contraction, which produces voids in the liquid crystal and causes the defect of bubbling. PSs are usually made of a material such as Polymethyl Methacrylate (PMMA) or Polycarbonate (PC), whose Coefficient of Thermal Expansion (CTE) does not well match that of liquid crystal; as a result, it is hard to avoid gravity mura and bubbling, which tremendously lowers the display quality of a LCD display.

SUMMARY

An embodiment of the present invention provides a LCD panel, comprising a first substrate; a second substrate, wherein the first and second substrates are assembled together to form a cell, in which liquid crystal is provided; and spacers provided between the first substrate and the second substrate, used to keep a cell gap between the two substrates, wherein materials used to form the respective spacers comprise N kinds, where N is a natural number, greater than or equal to two, and wherein the spacers comprise, at least, first-type spacers and second-type spacers, which are formed of different kinds of materials, the material for the first-type spacers has a thermal expansion coefficient lower than that of liquid crystal, the material for the second-type spacers has a thermal expansion coefficient higher than that of liquid crystal, and the first-type spacers and the second-type spacers are disposed in alternation.

Another embodiment of the present invention also provides a method of manufacturing a LCD panel, comprising steps of:

depositing a first material layer on a first substrate and/or a second substrate and patterning the first material layer so as to form first-type spacers;

depositing a second material layer on the first substrate and/or a second substrate and patterning the second material layer so as to form second-type spacers, the first-type spacers and the second-type spacers being disposed in alternation; and assembling the first substrate and the second substrate together to form a cell, the first-type spacers and the second-type spacers being used to keep a cell gap between the two substrates.

Still another embodiment of the present invention provides another method of manufacturing a LCD panel, comprising steps of:

printing, through transfer printing, a pattern of first-type spacers on a first substrate and/or a second substrate;

printing, through transfer printing, a pattern of second-type spacers on the first substrate and/or the second substrate, the second-type spacers and the first-type spacers being disposed in alternation, and the thermal expansion coefficient of liquid crystal being between the thermal expansion coefficient of the first-type spacers and the thermal expansion coefficient of the second-type spacers; and assembling the first substrate and the second substrate together to form a cell, the first-type spacers and the second-type spacers being used to keep a cell gap between the two substrates.

A further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

An embodiment of the present invention provides a LCD display panel. The LCD display panel comprises a first substrate and a second substrate. A plurality of spacers are formed between the first substrate and the second substrates, so as to maintain a cell gap between the two substrates. Moreover, each spacer is formed of one kind of material. The materials used to form the spacers comprise "N" kinds, where N is a natural number, greater than or equal to two. The spacers comprise at least two types: first-type spacers and second-type spacers formed of different kinds of materials. The material for the first-type spacers has a CTE lower than that of liquid crystal; the material for the second-type spacers has a CTE higher than that of liquid crystal in the LCD panel. The first-type spacer and the second-type spacers are disposed in alternation. Here, the "one kind of material" that forms one spacer can be a simple substance, a compound, or a mixture thereof it can also be a composite material.

The first and the second substrates of a LCD panel according to an embodiment of the present invention can be, respectively, a color filter substrate and an array substrate. The spacers can be formed on either the color filter substrate or the array substrate, or on both of them. The spacers can be formed in the opaque areas or the transparent areas of any substrate, but preferably in the opaque areas to avoid light shielding or light leakage. The base substrate of the color filter substrate can be provided with color filter resin units and a black matrix, arranged in matrix; an opaque area corresponds to the area where the black matrix is disposed, and a transparent area corresponds to the area where a color filter resin unit is disposed. Regarding the array substrate, the opaque areas correspond to the areas where the TFT (thin film transistor) switch, the gate line, or the data line is disposed, and the transparent areas correspond to the area where the pixel electrode and the like are disposed.

The spacers disposed on the LCD panel are made of various kinds of materials. At least some spacers have a CTE lower than that of liquid crystal, and at least some spacers have a CTE larger than that of liquid crystal. Moreover, the spacers with a low CTE and the spacers with a high CTE are disposed in alternation.

The material of the spacers in prior art usually has a CTE lower than that of liquid crystal, and as a result, gravity mura occurs because the holding force (the force imposed on the spacers that sustain the two substrates) of the spacers at high temperature is smaller that that at room temperature, and bubbling occurs because the holding force of the spacers at low temperature is larger that that at room temperature.

At high temperature, liquid crystal expands with heat. Under the spacer disposing scheme of the embodiment of the present invention, the spacers with a CTE larger than that of liquid crystal have an expansion larger than that of liquid crystal, while the spacers with a CTE lower than that of liquid crystal have an expansion smaller than that of liquid crystal. Due to presence of the two types of spacers, the increase and decrease of the holding force of the spacers counterpoise each other, which renders the total holding force equal to that at room temperature and thus prevents occurring of gravity mura. At low temperature, liquid crystal contracts. Under the spacer disposing scheme of the embodiment of present invention, the contraction of the spacers equals that of liquid crystal, i.e., the total holding force equals that at room temperature, which avoids occurring of bubbling.

The spacers formed on the LCD panel of the embodiment of the present invention are made of different kinds of materials, which functions to avoid defects at both high temperature and low temperature. The presence of the two types of spacers renders the effective CTE of the spacers close to or equal to the CTE of liquid crystal, and thus forestalls defects arising from the CTE discrepancy between the spacers and liquid crystal. The selection of the materials, the numbers and positions of the respective spacers can vary, details being described in the following embodiments with references to the drawings.

The First Embodiment

Figure 1:
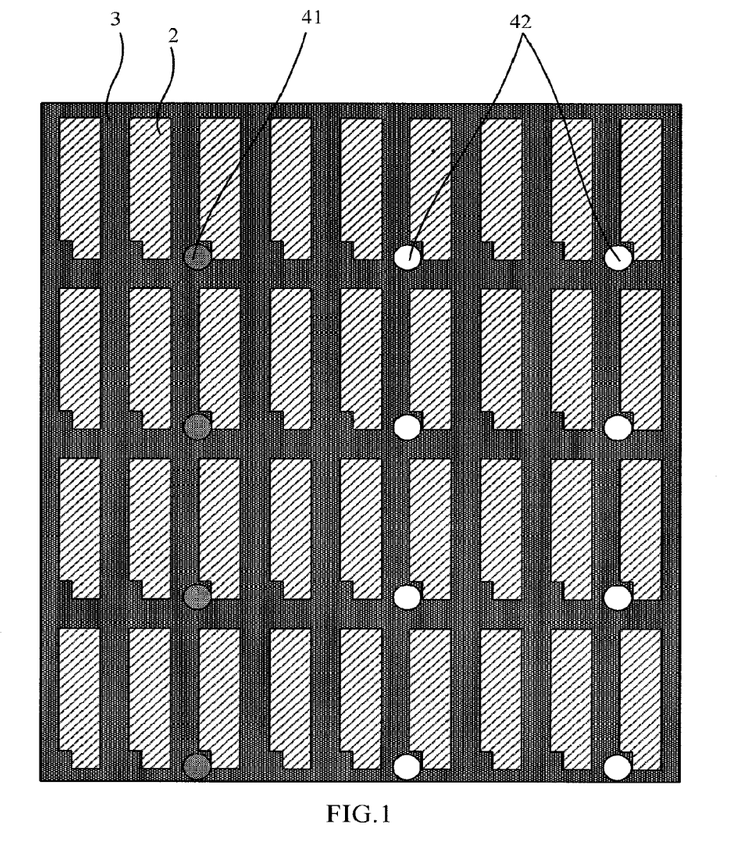
FIG. 1 is a top view showing the structure of a substrate of the LCD panel of a first embodiment.
Figure 2:
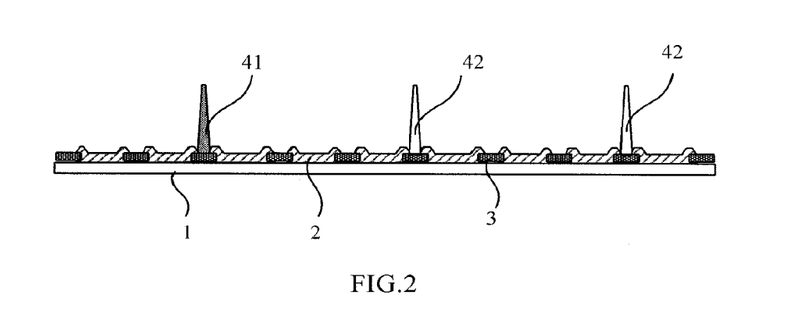
FIG. 2 is the side view of FIG. 1.

FIG. 1 is a top view showing the structure of a substrate of the LCD panel of the first embodiment, FIG. 2 is the side view of FIG. 1. Spacers are disposed between the first substrate and the second substrate. The spacers shown in FIGS. 1 and 2 are formed on one substrate, i.e., the color filter substrate. FIG. 1 is the top view of some pixel units on the color filter substrate. The color filter substrate comprises a first base substrate 1, which is made of a material such as glass. Color filter resin units 2 and a black matrix 3 are disposed on the base substrate 1. Each color filter resin unit corresponds to one sub-pixel; every three color filter resin units 2 collectively correspond to one pixel unit. The black matrix 3 corresponds to the areas of the array substrate where light ought to be blocked, such as the areas of data lines, gate lines, and TFT switches. On the black matrix 3 are formed spacers made of two kinds of materials, first-types spacers 41 and second-type spacers 42, and these spacers can be PSs. The spacers in this embodiment are disposed on the part of the black matrix 3 that corresponds to the TFT switches, and they can also be disposed on the part of the black matrix 3 that corresponds to the gate lines or the data lines. In addition, there is no requirement that one pixel unit has only one spacer; one spacer can be provided for each sub-pixel or for a plurality of pixel units, and the spacers can be unevenly distributed. The material for the first-type spacers 41 has a CTE lower than that of liquid crystal, while the material for the second-type spacers 42 has a CTE higher than that of liquid crystal. The first-type spacers 41 and the second-type spacers 42 are disposed in alternation. Preferably, their numbers observe a ratio. The preferable number ratio is determined as follows.

For the sake of clarity, let CTE(A) stand for the CTE of the first-type spacers, A for the number of the first-type spacers, CTE(B) for the CTE of the second-type spacers, B for the number of the second-type spacers, and CTE(LC) for the CTE of liquid crystal. In this embodiment, the first-type spacers can be made of a typical material, with a CET(A) of $6 \times 10^{-5}$/K. CTE(LC), while the CTE of liquid crystal, is $2 \times 10^{-4}$/K. The second-type spacers can be made of a material, such as ultra-high molecular weight polyethylene, isobutene rubber, flexible polymer elastomer or polyurethane, and this embodiment employs a material with a CTE (B) of $2.7 \times 10^{-4}$/K. Subsequently, the number ratio is determined. The number ratio of the first-type spacers to the second-type spacers equals the ratio of the CTE difference between liquid crystal and the first-type spacers to the CTE difference between the second-type spacers and liquid crystal, i.e., B:A=[CTE(LC)−CTE(A)]/[CTE(B)−CTE(LC)]. In this embodiment, B:A=$(2 \times 10^{-4} - 6 \times 10^{-5})/(2.7 \times 10^{-4} - 2 \times 10^{-4})$=2:1. In the case the number ratio of the second-type spacers to the first-type spacers equals 2:1, and the combination of the two types of spacers has a CTE close or equal to that of liquid crystal.

To assure that the forces borne by respective spacers are uniform, it is preferable that the first-type spacers and the second-type spacers are evenly distributed on the base substrate 1. As shown in FIG. 1, for every pixel unit (i.e., three sub-pixel units), a first-type spacer 41 is disposed on the part of the black matrix 3 that corresponds to one pixel unit, and two second-type spacers are disposed respectively on the part of the black matrix 3 that corresponds to the other two pixel units. The spacers are uniformed spanned.

In this embodiment, the effects of the thermal expansion of the two types of spacers combine, it renders the CTE of the spacers as a whole close to or equal to that of liquid crystal, which reduces or almost completely prevents occurring of gravity mura at high temperature and occurring of bubbling at low temperature.

In this embodiment, the spacers are disposed between the two substrates of the LCD panel, specifically on the color filter substrate. The invention is not limited to such a practice. The first-type spacers and the second-type spacers can be formed on either substrate of the LCD panel, or a part or all of the first-type spacers and the second-type spacers can be formed on the two substrates respectively, as long as they are disposed in alternation after the panel is assembled.

The Second Embodiment

Figure 3:
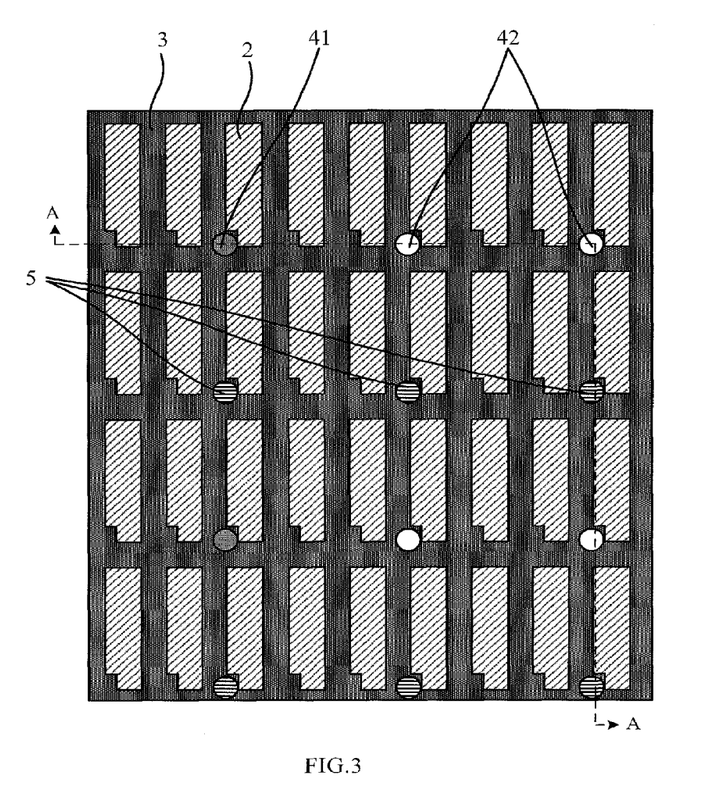
FIG. 3 is a top view showing the structure of a substrate of the LCD panel of a second embodiment.
Figure 4:
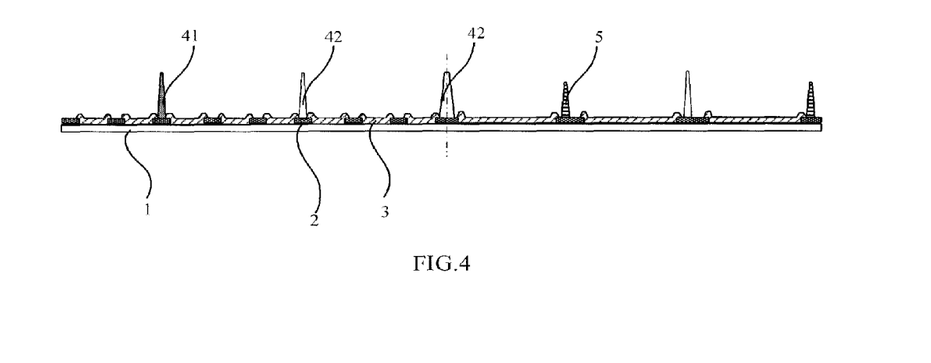
FIG. 4 is the cross-sectional view along A-A of FIG. 3.

FIG. 3 is a top view showing the structure of a substrate of the LCD panel of the second embodiment, FIG. 4 is the cross-sectional view along A-A of FIG. 3. This embodiment differs from the first embodiment in the aspects as follows. The spacers disclosed in the first embodiment constitute primary spacers; while in this embodiment, the primary spacers between the two substrates have a lower number density, and besides the primary spacers, i.e., the first-type spacers 41 and the second-type spacers 42, secondary spacers 5 are formed between the first substrate and the second substrate. The secondary spacers 5 can also be disposed on the black matrix 3 of the color filter substrate. The secondary spacers 5 have a height smaller than that of the primary spacers when the liquid crystal is at normal state. Here, the term "normal sate" means the state where the liquid crystal is at room temperature, with no expansion or contraction, e.g., when the LCD panel is in use or is assembled at room temperature.

The primary spacers and the secondary spacers complement each other. The primary spacers are usually in contact with the elevated area of the array substrate and thus keep the cell gap, while the secondary spacers does not contact the array substrate at normal state, they can reinforce the strength of the spacers when an external force is exerted on the LCD panel and thus help to keep the cell gap. In this embodiment, although the numbers of the first-type spacers and the second-type spacers are decreased, they are made of the same materials and have the same number ratio as those in the first embodiment, and are evenly disposed in alternation. The secondary spacers are disposed between first-type spacers and second-type spacers. As they are usually not in contact with the array substrate, it is unnecessary to use different materials to form the secondary spacers. Of course, to better match the CTE of liquid crystal, M kinds of materials can be used to form the secondary spacers, and M is a natural number, greater than or equal to two. The number ratio of different types of secondary spacers can be obtained through calculation. The sum of the products of the number ratio of each type of secondary spacers to all the secondary spacers and the CTE of the each type of secondary spacers equals the CTE of liquid crystal. Secondary spacers formed of different materials are disposed in alternation, preferably evenly distributed on the color filter substrate, so that the forces borne by respective spacers are uniform.

The second embodiment adds the secondary spacers to the first embodiment, the combination of the two types of primary spacers as well as the secondary spacers is suitable for maintaining the cell gap and prevents occurring of gravity mura at high temperature and occurring of bubbling at low temperature, which improves the display quality of a LCD panel. In this embodiment, the distribution pattern of the primary spacers and secondary spacers is not limited to that shown in the drawings, it can be an uneven one, or the spacers can be disposed on the areas that are prone to incur defects.

The Third Embodiment

Figure 5:
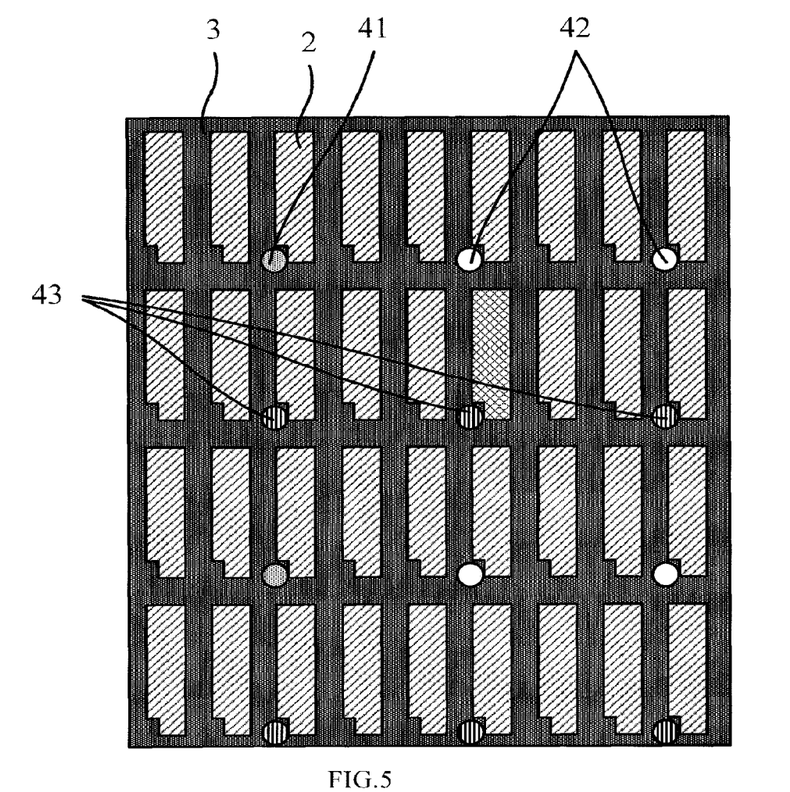
FIG. 5 is a top view showing the structure of a substrate of the LCD panel of a third embodiment.
Figure 6:
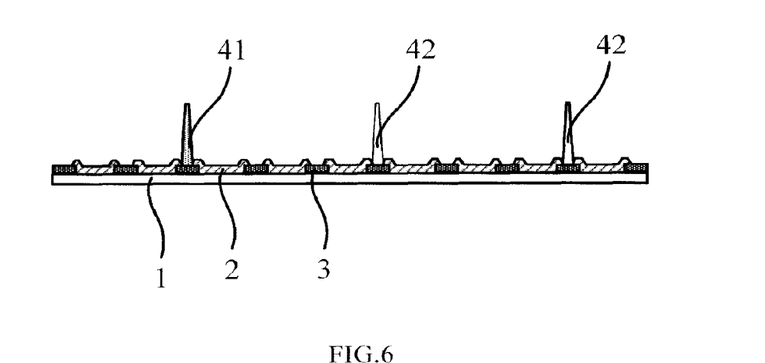
FIG. 6 is the side view of FIG. 5.

FIG. 5 is a top view showing the structure of a substrate of the LCD panel of the third embodiment, FIG. 6 is the side view of FIG. 5. This embodiment differs from the first embodiment in the following aspects: in this embodiment, three kinds of materials are used to form respective spacers, i.e., the spacers further comprise third-type spacers 43. The third-type spacers 43 can have a CTE greater than, equal to, or smaller than that of liquid crystal. The first-type, second-type, and third-type spacers are disposed in alternation, and it is preferable that the CTE of the spacers as a whole is close to or equal to that of liquid crystal.

The number ratio can be obtained through calculation. The number of the kinds of materials for the spacers is not limited to three. Generalized from the case of first-type spacers and second-type spacers, the spacers can be formed of N kinds of materials, where N is a natural number, greater than 2. The sum of the products of the number ratio of each type of spacers to all the spacers and the expansion coefficient of the each type of the spacers equals the thermal expansion coefficient of liquid crystal. Let A . . . N stand for the numbers of the N types of spacers, respectively, CTE(A) . . . CTE(N) for the CTEs of the N types of spacers, respectively, the number ratio fulfills:

$$CTE(A) \times \frac{A}{A+B+\ldots+N} + CTE(B) \times \frac{B}{A+B+\ldots+N} + \ldots + CTE(N) \times \frac{N}{A+B+\ldots+N} = CTE(LC).$$

In this embodiment, the number ratio of the first-type spacers 41 to the second-type spacers 42 to the third-type spacers 41 is 1:2:3, as shown in FIG. 5.

The Fourth Embodiment

Figure 7:
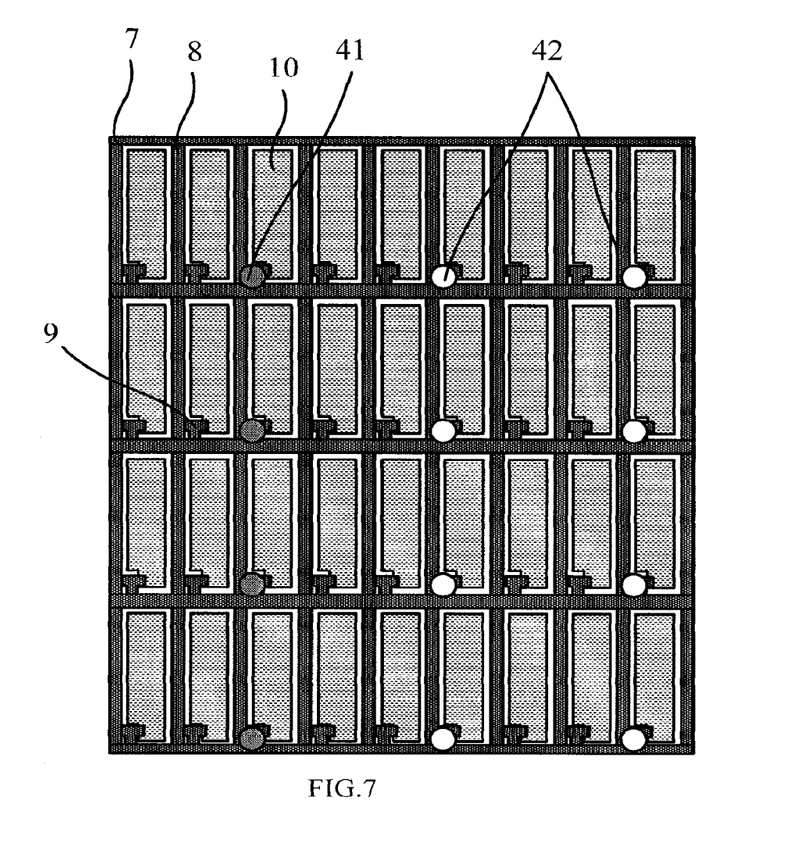
FIG. 7 is a top view showing the structure of a substrate of the LCD panel of a fourth embodiment.
Figure 8:
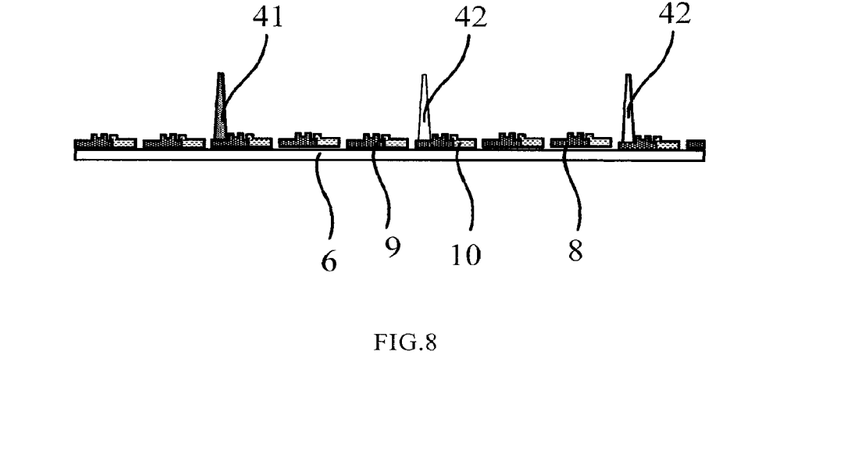
FIG. 8 is the side view of FIG. 7.

FIG. 7 is a top view showing the structure of a substrate of the LCD panel of the fourth embodiment, FIG. 8 is the side view of FIG. 7, showing the case of spacers being formed on the array substrate. The array substrate comprises a second substrate 6. A plurality of function layer structures are formed on the second substrate 6, comprising those for forming gate lines 7, data lines 8, TFT switches 9, and pixel electrodes 10. The pixel electrodes 10 correspond to the transparent areas for image displaying, while the gate lines 7, the data lines 8, and the TFT switches 9 correspond to the opaque areas, also corresponding to the black matrix on the color filter substrate that faces the array substrate. Spacers can be disposed on the gate lines 7, the data lines 8, and/or the TFT switches 9. In this embodiment, specifically, the spacers are disposed on the TFT switches 9.

In particular, the spacers comprise the first-type spacers 41 and the second-type spacers 42. The material for the first-type spacers 41 has a CTE lower than that of liquid crystal, while the material for the second-type spacers 42 has a CTE higher than that of liquid crystal. The first-type spacers 41 and the second-type spacers 42 are disposed in alternation, preferably, their numbers observe a ratio, i.e., the number ratio of the first-type spacers to the second-type spacers equals the ratio of the thermal expansion coefficient difference between liquid crystal and the first-type spacers to the thermal expansion coefficient difference between the second-type spacers and liquid crystal.

Please refer to the aforementioned embodiments for the detailed description of the number ratio and the mechanism of the spacers. Similarly in this embodiment, the effects of the thermal expansion of the two types of spacers combine, this renders the CTE of the spacers as a whole close to or equal to that of liquid crystal, which reduces or even completely avoids occurring of gravity mura at high temperature and occurring of bubbling at low temperature.

Based on the above embodiment of the array substrate, it is preferable that the first-type spacers and the second-type spacers are evenly distributed on the array substrate, so as to provide balanced holding force. The number of the kinds of materials for the spacers is not limited to two; the respective spacers can be formed of N kinds of materials, where N is a natural number, greater than two.

The array substrate can further comprise secondary spacers, and the secondary spacers are also formed on the opaque areas and have a height lower than that of the spacers when the liquid crystal is at normal state.

In this embodiment, the spacers are disposed between the two substrates of the LCD panel, specifically on the array substrate. The invention is not limited to this, the first-type spacers and the second-type spacers can be formed on either substrate of the LCD panel, or a part or all of the first-type spacers and the second-type spacers can be formed on the two substrates respectively, as long as they are disposed in alternation after the panel is assembled.

The Fifth Embodiment

A method of manufacturing a LCD panel according to the fifth embodiment comprises the following steps of:

Step 100a, depositing a first material layer on a first substrate and/or a second substrate, and etching the first material layer with a patterning process, so as to form first-type spacers;

Step 200a, depositing a second material layer on the first substrate and/or the second substrate, and etching the second material layer with a patterning process, so as to form second-type spacers, the first-type spacers and the second-type spacers being disposed in alternation; and Step 300a, assembling the first substrate and the second substrate to form a panel, the first-type spacers and the second-type spacers being used to keep a cell gap between the two substrates.

In this embodiment, the spacers are disposed between the two substrates of the LCD panel. During forming of the spacers, the first-type spacers and the second-type spacers can be formed on either substrate of the LCD panel, or a part or all of the first-type spacers and the second-type spacers can be formed on the two substrates respectively, as long as they are disposed in alternation after the panel is assembled to form a panel.

For example, forming of the second-type spacers on the first substrate and/or the second substrate can specifically comprise: forming second-type spacers on the substrate provided with first-type spacers, i.e., the two types of spacers are formed on the same substrate.

Or, forming of the second-type spacers on the substrate without the first-type spacers. In this way, the two spacers can be formed at the same time, which saves time.

The method of manufacturing a LCD panel according to the present embodiment can be employed to produce a LCD panel according to any one of the previously described embodiments. The spacers of the LCD panel can be formed with the PS-forming process. Spacers of different materials can be formed with the same kind of PS-forming processes, while the order to form them is flexible. In particular, the process of forming the respective spacers with different materials can comprise steps of forming a material film, exposing, and etching. All types of spacers can have the same shape and dimension. In the aforementioned embodiments, the first-type spacers and the second-type spacers are assumed to have the same shape and dimension. However, different types of spacers can have different shapes and dimensions, as long as the CTE of the spacers as a whole is close to or equal to that of liquid crystal.

In this embodiment, forming of the first-type spacers and forming of the second-type spacers can specifically comprise following steps of:

depositing a first material layer with a first thickness on a first substrate, and etching the first material layer with a patterning process, so as to form the first-type spacers; and depositing a second material layer with a second thickness on the first substrate, and etching the second material layer with a patterning process, so as to form the second-type spacers, wherein the first-type spacers and the second-type spacers are disposed in alternation, the second thickness is smaller than the first thickness, and the time of etching the second material layer is longer than the time needed to completely etching the second material layer.

The first-type spacers and the second-type spacers are formed of different materials, and the thickness etched can be controlled though selecting appropriate etchant and etching time. To assure that the spacers formed first does not have the leftover of the materials of the spacers formed afterwards, the first thickness can be set larger than the second thickness, and the time of etching the second material layer is longer than the time needed to completely etch the second material layer with the second thickness. In this way, after the second material layer with the second thickness is completely etched, the etching goes on for a while, so that the first-type spacers formed with the first thickness is further etched, and the first thickness is reduced to the second thickness through controlling the etching time, which brings the first thickness equal to the second thickness and assures that the first-type spacers does not have the leftover of the materials of the second material layer on their top surfaces.

The Sixth Embodiment

A method of manufacturing a LCD panel according to the sixth embodiment comprises the following steps of:

Step 100b, printing, through transfer printing, a pattern of first-type spacers on a first substrate and/or a second substrate;

Step 200b, printing, through transfer printing, a pattern of second-type spacers on the first substrate and/or the second substrate, wherein the second-type spacers and the first-type spacers are disposed in alternation, and the thermal expansion coefficient of liquid crystal is between the thermal expansion coefficient of the first-type spacers and the thermal expansion coefficient of the second-type spacers; and Step 300b, assembling the first substrate and the second substrate together to form a panel, the first-type spacers and the second-type spacers being used to keep a cell gap between the two substrates.

In this embodiment, the spacers are disposed between the two substrates of the LCD panel. During forming of the spacers, the first-type spacers and the second-type spacers can be formed on either substrate of the LCD panel, or a part or all of the first-type spacers and the second-type spacers can be formed on the two substrates respectively, as long as they are disposed in alternation after the panel is assembled together to form a panel.

For example, forming the second-type spacers on the first substrate and/or the second substrate can specifically comprise: forming second-type spacers on the substrate provided with first-type spacers, i.e., the two types of spacers are formed on the same substrate.

Or, forming the second-type spacers on the substrate without the first-type spacers formed thereon. In this way, the two spacers can be formed at the same time, which saves time.

The method of manufacturing a LCD panel according to the present embodiment can be employed to produce a LCD panel according to any of the previously described embodiments. Before the pattern of the first-type spacers/the second-type spacers are formed, the method can further comprise steps of:

applying a first/second material layer on the cylindrical transfer plate; and removing part of the material of the first/second material layer with a printing plate, thus retaining a pattern of the first-type/second-type spacers.

Based on analyzing the underlying mechanism behind the gravity mura and bubbling, the embodiments of the present invention improves the design of spacers, so that the spacers as a whole have a CTE close to that of liquid crystal, which widens the applicable range of the amount of liquid crystal enclosed in the LCD panel. When the applicable range is widened, the processes can be done with lower accuracy, which reduces cost and improves the yield. The present invention can effectively reduce occurring of gravity mura and bubbling, which improves the display quality of a LCD display. Moreover, a LCD panel according to an embodiment of the present invention is more adaptable to temperature change, and thus can be used in a wider range of temperature.

Lastly, it will be obvious that the same may be varied in many ways. Such variations are not to be regarded as a departure from the spirit and scope of the invention, and all such modifications as would be obvious to those skilled in the art are intended to be comprised within the scope of the following claims.

What is claimed is:

1. A method of manufacturing a liquid crystal display (LCD) panel, comprising steps of:
   depositing a first material layer on a first substrate and/or a second substrate and patterning the first material layer so as to form first-type spacers;
   depositing a second material layer on the first substrate and/or a second substrate and patterning the second material layer so as to form second-type spacers, the first-type spacers and the second-type spacers being disposed in alternation; and
   assembling the first substrate and the second substrate together to form a cell, and providing liquid crystal in the cell, the first-type spacers and the second-type spacers being configured to keep a cell gap between the two substrates, and thermal expansion coefficient of liquid crystal being between thermal expansion coefficient of the first-type spacers and thermal expansion coefficient of the second-type spacers.

2. The method of manufacturing a LCD panel according to claim 1,
   wherein forming of the first-type spacers and forming of the second-type spacers comprise steps of:
   depositing the first material layer with a first thickness on the first substrate, and patterning the first material layer so as to form the first-type spacers; and
   depositing the second material layer with a second thickness on the first substrate, and patterning the second material layer so as to form the second-type spacers, wherein the second thickness is smaller than the first thickness, and the time of etching the second material layer is longer than the time of etching the first material layer.

3. A method of manufacturing a liquid crystal display (LCD) panel, comprising steps of:
   printing, through transfer printing, a pattern of first-type spacers on a first substrate and/or a second substrate;
   printing, through transfer printing, a pattern of second-type spacers on the first substrate and/or the second substrate, the second-type spacers and the first-type spacers being disposed in alternation; and
   assembling the first substrate and the second substrate together to form a cell, and providing liquid crystal in the cell,
   wherein the first-type spacers and the second-type spacers are configured to keep a cell gap between the two substrates, and thermal expansion coefficient of liquid crystal being between thermal expansion coefficient of the first-type spacers and thermal expansion coefficient of the second-type spacers.

4. The method of manufacturing a LCD panel according to claim 2,
   wherein before printing the pattern of the first-type spacers or the second-type spacers, the method further comprises steps of:
   applying a first/second material layer on a cylindrical transfer plate; and
   removing part of the material of the first/second material layer with a printing plate, and retaining a pattern of the first-type/second-type spacers.

5. The method of manufacturing a LCD panel according to claim 1, wherein the thermal expansion coefficient of the spacers as a whole is close to or equal to that of the liquid crystal.

6. The method of manufacturing a LCD panel according to claim 3, wherein the thermal expansion coefficient of the spacers as a whole is close to or equal to that of the liquid crystal.

* * * * *